United States Patent
Liu

(10) Patent No.: US 11,556,530 B2
(45) Date of Patent: Jan. 17, 2023

(54) CROSS-LANGUAGE SEARCH

(71) Applicant: Citrix Systems, Inc., Fort Lauderdale, FL (US)

(72) Inventor: Lin Liu, Nanjing (CN)

( * ) Notice: Subject to any disclaimer, the term of this patent is extended or adjusted under 35 U.S.C. 154(b) by 0 days.

(21) Appl. No.: 17/160,580

(22) Filed: Jan. 28, 2021

(65) Prior Publication Data
US 2022/0197905 A1 Jun. 23, 2022

Related U.S. Application Data

(63) Continuation of application No. PCT/CN2020/138614, filed on Dec. 23, 2020.

(51) Int. Cl.
*G06F 16/00* (2019.01)
*G06F 16/2453* (2019.01)
*G06F 3/0482* (2013.01)
*G06F 16/248* (2019.01)

(52) U.S. Cl.
CPC ...... *G06F 16/24534* (2019.01); *G06F 3/0482* (2013.01); *G06F 16/248* (2019.01)

(58) Field of Classification Search
CPC .......... G06F 16/3337; G06F 16/3344
USPC ....................... 707/760
See application file for complete search history.

(56) References Cited

U.S. PATENT DOCUMENTS

| | | | |
|---|---|---|---|
| 2004/0162825 A1 | 8/2004 | Bhaghavan et al. | |
| 2008/0288474 A1* | 11/2008 | Chin | G06F 16/3337 |
| 2009/0024595 A1* | 1/2009 | Chen | G06F 40/58 |
| 2009/0259629 A1* | 10/2009 | Wei | G06F 16/3338 |
| 2012/0233196 A1* | 9/2012 | Wu | G06F 16/583 |
| | | | 707/760 |
| 2013/0138421 A1* | 5/2013 | Moulder | G06F 40/242 |
| | | | 704/3 |
| 2017/0277683 A1* | 9/2017 | Bhagat | G06Q 30/0641 |

FOREIGN PATENT DOCUMENTS

| | | |
|---|---|---|
| CN | 104572642 A | 4/2015 |
| CN | 109933724 A | 6/2019 |
| WO | 2015051670 A1 | 4/2015 |

OTHER PUBLICATIONS

Guihong Cao et al.; "Extending Query Translation to Cross-Language Query Expansion with Markov Chain Models"; CIKM '07, Nov. 6-8, 2007, Lisboa, Portugal, 10 pages.*
Machine translated copy of Wu (CN10933724); Jun. 25, 2019; 4 pages.*
International Search Report and Written Opinion for International Application No. PCT/CN2020/138614 dated Sep. 26, 2021 (9 pages).

* cited by examiner

*Primary Examiner* — Monica M Pyo

(57) ABSTRACT

In accordance with one disclosed method, a computing system may receive, via a first version of an application presenting an interface in a first language, a first query entered in a second language different from the first language. The computing system may search resources accessible to a second version of the application to identify at least a first resource corresponding to the first query, the second version of the application being in the second language. Based at least in part on a result of the searching, an indication of the first resource may be returned to the interface.

18 Claims, 11 Drawing Sheets

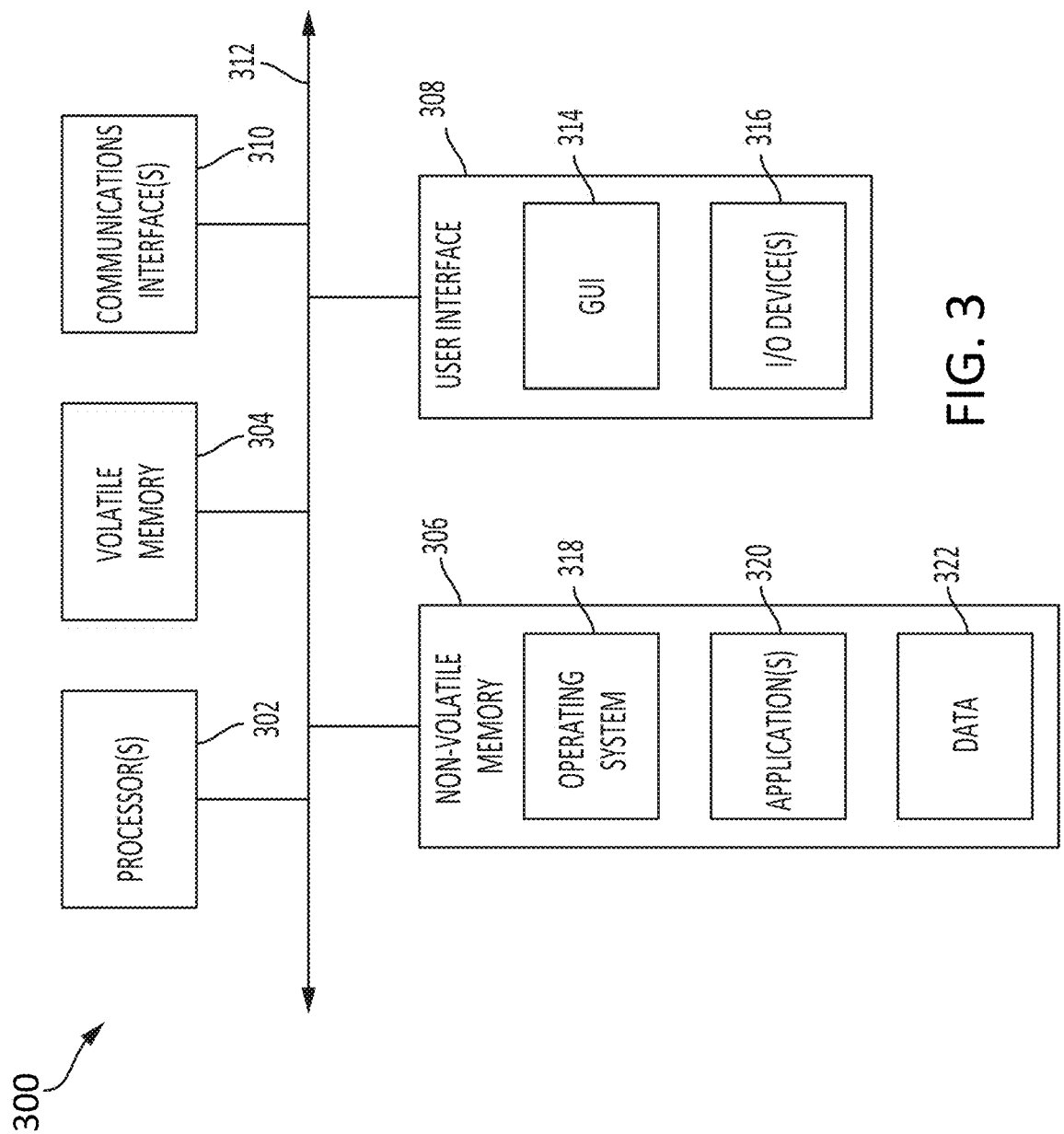

CROSS-LANGUAGE SEARCH

CROSS-REFERENCE TO RELATED APPLICATIONS

This application is a continuation of and claims the benefit under 35 U.S.C. § 120 and 35 U.S.C. § 365(c) to International Application PCT/CN2020/138614, entitled CROSS-LANGUAGE SEARCH, with an international filing date of Dec. 23, 2020, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments a method involves receiving, by a computing system and via a first application presenting an interface in a first language, a first query entered in a second language different from the first language. The computing system searches resources accessible to a second application to identify at least a first resource corresponding to the first query, the second application being in the second language. Based at least in part on a result of the searching, an indication of the first resource is returned to the interface.

In some disclosed embodiments a method involves receiving, by a computing system and via an application presenting an interface in a first language, a query entered in a second language different from the first language. The computing system translates the query from the second language into a different language to generate a translated query, and searches resources accessible by the application to identify at least a first resource that corresponds to the translated query. Based at least in part on a result of the searching, an indication of the first resource is returned to the interface, wherein the first resource is presented in the first language.

In some disclosed embodiments, a computing system comprises at least one processor and at least one computer-readable medium encoded with instructions which, when executed by the at least one processor, cause the computing system to receive, via a first application presenting an interface in a first language, a first query entered in a second language different from the first language, to search resources accessible to a second application to identify at least a first resource corresponding to the first query, the second application being in the second language, and to return, to the interface and based at least in part on a result of the searching, an indication of the first resource.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 3 is a block diagram of a computing system that may be used to implement one or more of the components of the computing environment shown in FIG. 2 in accordance with some embodiments;

DETAILED DESCRIPTION

For purposes of reading the description of the various embodiments below, the following descriptions of the sections of the specification and their respective contents may be helpful:

Section A provides an introduction to example embodiments of a resource delivery system configured in accordance with the present disclosure;

Section B describes a network environment and computing environment which may be useful for practicing embodiments described herein;

Section C describes embodiments of systems and methods for managing and streamlining access by clients to a variety of resources;

Section D provides a detailed description of example embodiments of a resource delivery system configured in accordance with the present disclosure; and Section E describes example implementations of methods, systems, and computer-readable media in accordance with the present disclosure.

A. Introduction to Illustrative Embodiments of a Resource Delivery System

Figure 1A:
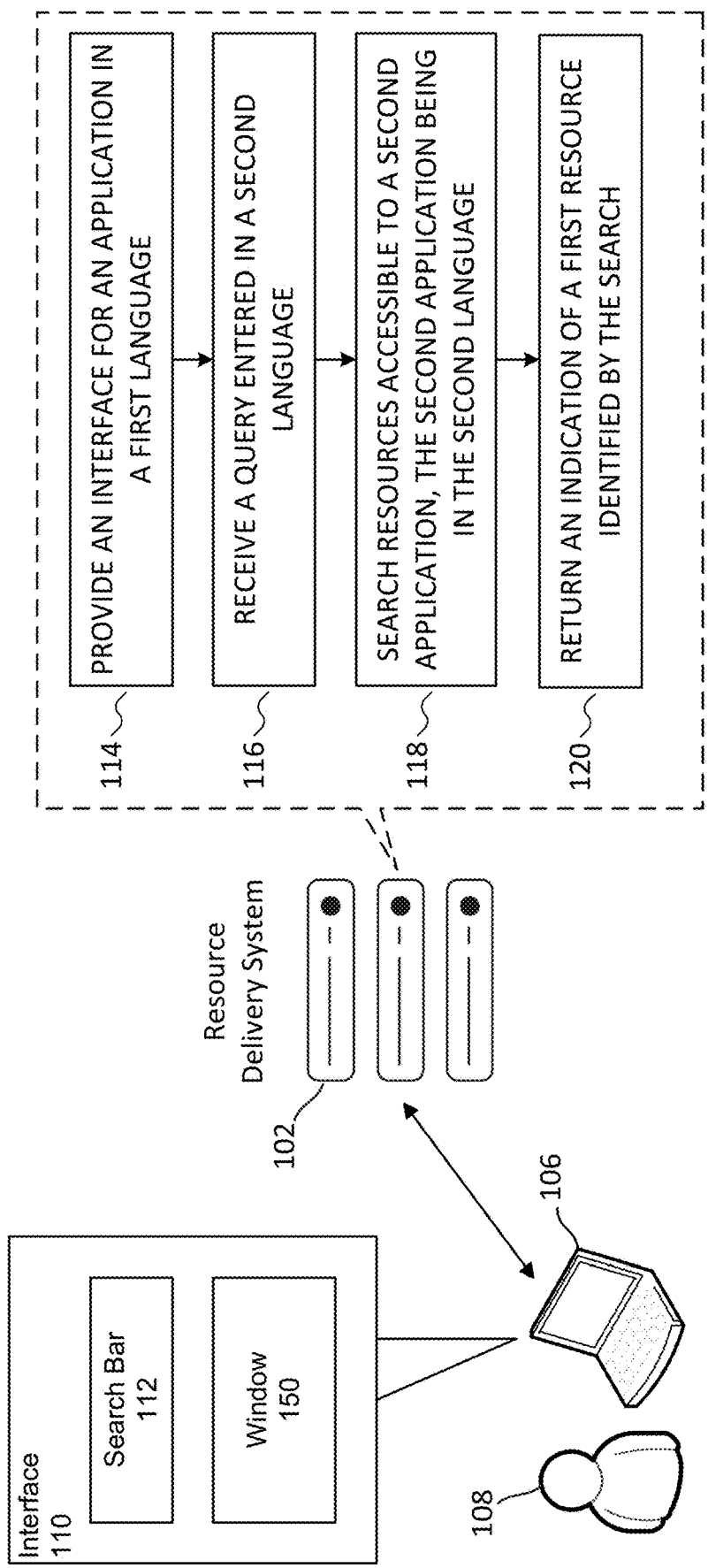
FIG. 1A is a diagram illustrating first example operations of a resource delivery system configured for cross-language search in accordance with the present disclosure.
Figure 1B:
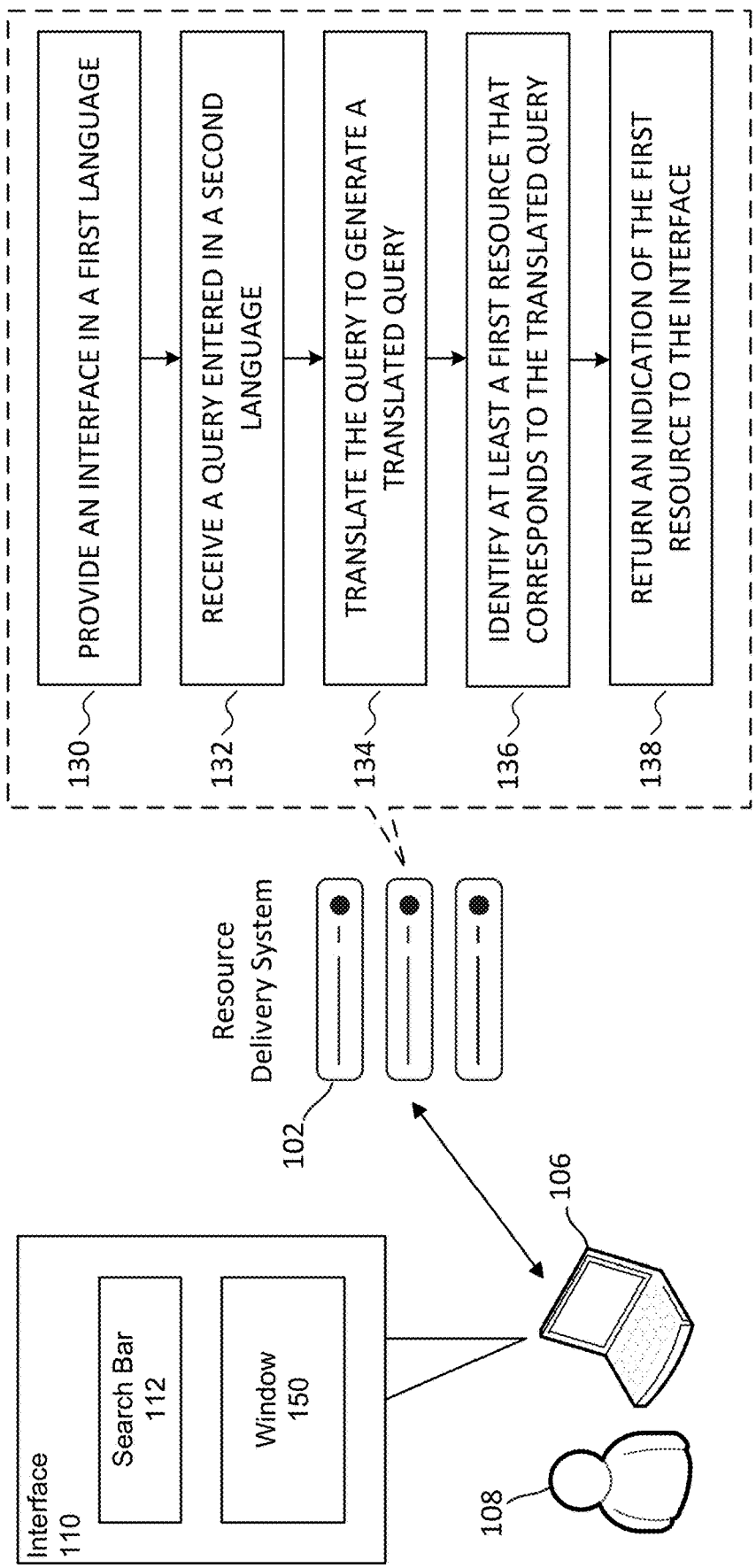
FIG. 1B is a diagram illustrating second example operations of a resource delivery system configured for cross-language search in accordance with the present disclosure.

FIGS. 1A-1B show example embodiments of a resource delivery system 102 that may be used to implement various aspects of the present disclosure. Although the illustrated examples show the resource delivery system 102 as including three servers, it should be appreciated that the resource delivery system 102 may include any number of servers or other computing devices (including only a single server) as well as any number of additional or different components, such as one or more databases, other network components, etc. The servers may include, for example, any of the servers 204 described below in Sections B and C. The system 102 may provide a client device 106 with access to resources such as one or more applications, websites, portals, etc. The client device 106 may correspond to any of the client devices 202 described below in Sections B and C, and may, for example, be embodied as a personal computer, a mobile device such as a tablet or mobile phone, or a thin client. In various implementations, the operations described with respect to the resource delivery system 102 may be performed on the client device 106, and vice versa. The operations described in Sections A and D may be functionality of a single application or multiple applications. Similarly, the delivered resources may be functions of the application itself and/or other applications, which may reside on the client device 106, the resource delivery system 102, or a combination of one or more client devices 106 and/or resource delivery systems 102.

Nowadays it is common for online resources to support multiple languages. For example, applications, websites, documents, databases, media, and other electronic resources may be available in different languages. Users may access the resources via an interface such as a web browser, a client application, a portal, or other type of graphical-user-interface. The interface may be provided by an application. The application may include software executing on one or both of the client device 106 or the system 102. For example, the application may be a standalone application executing on the client device 106 or a Software-As-A-Service (SAAS) application executing on the system 102 and accessed via the client device 106 using a website or web portal. The application may be, for example and without limitation, a web browser, a productivity application such as for word processing or database management, a communication application such as an email or instant messaging client, a search engine, etc. An application may have various versions presented in different languages. For example, an application may have an English-language version, a Chinese-language version, a French-language version, etc. The user 108 may install and/or select an application and/or application version suiting their language preference. The application and/or interface it provides may be presented in a particular language, and may also be available in other languages. As used herein, different languages may refer to different spoken and/or written languages and/or dialects, including different writing systems corresponding to a spoken language; for example, the kana and kanji writing systems of the Japanese language.

A user wishing to access a resource via an interface may enter a query that may represent a name or feature of a resource of interest. The query may include a name, keyword, and/or phrase associated with the resource. The interface will typically execute the search in the language in which the interface is presented. For example, an interface presented in English may execute a search query using an English search index and return English-language resources in the results.

Different language resource versions may have different names. In some cases, the user may search for a resource using a keyword in a language other than the language of the interface. The user may do so because the name is easier to enter and/or because it is more familiar. For example, the user may search for the resource by entering an English-language keyword into a Chinese-language interface. The Chinese-language interface, however, may not return useful results based on the English-language search query.

This disclosure proposes systems and methods enabling cross-language searching. Cross-language searching may apply, for example, when a language of a query and/or result differs from a language of an application and/or interface. In some implementations, the cross-language search may involve translation (e.g., with use of machine translation techniques) of the search query. The system 102 may receive the query via an interface presented in a first language. The query being a keyword, phrase abbreviation or other textual input in a second language different than that of the interface. The system 102 may perform a machine translation of the content of the query, and perform a search based on the translated query. The system 102 may then return results in the first language.

In some implementations, the system 102 may additionally or alternatively perform searches for the keyword, phrase, and/or an abbreviation in multiple languages; for example, the language of the interface and the language of the query. The system 102 may then provide combined results from both searches. In some cases, resources may have identifiers, such as a resource identifier (ID). A resource may have multiple versions, such as a first version in a first language, a second version in a second language, etc. The resource ID for a version of the resource in a first language may be the same as, or correlate to, a resource ID for a version of the resource in a second language. Thus, the system 102 may search for resources in the second language and, using a resource ID of a resource returned in the search results, identify a resource in the first language. Performing a search in the language of the query and identifying the version of the resource in the language of the interface may be helpful when resource versions have names that have different meanings in their respective languages; for example, a resource named "Crane" in one language but "Heron" in another. Cross-language search may be particularly beneficial in a dynamic environment where resources change frequently, making static solutions such as lookup tables impractical.

FIG. 1A is a diagram illustrating first example operations of a resource delivery system 102 configured for cross-language search in accordance with the present disclosure. The system 102 may be in communication via a computer network (not shown) with one or more client devices 106 associated with a user 108. As shown, a client device 106 may present an interface 110, such as images and/or interactive graphical elements, using a monitor, screen, or touchscreen capable of displaying information to the user 108. In the example shown in FIG. 1A, the interface 110 shows a search bar 112 and a window 150. As shown, the resource delivery system 102 may, at a step 114, provide an interface 110 in a first language via a first application. The application may be, for example any of the various applications or other resources that are accessible using a resource access application, such as the resource access application 422 described below with reference to FIG. 4B. The interface 110 may be, for example, a graphical user interface (GUI) presented on a display of the device 106. The interface 110 may be a browser or application window displaying various graphical elements such as fields, frames, and/or windows for receiving input from, for example, a keyboard of the device 106, or displaying output such as search results and other data provided by the application. In some examples, the interface may be part of an application, such as a web or Software-As-A-Service (SAAS) application, hosted on a computing device remote from the client device 106. The application may execute on one or more servers of the resource delivery system 102, the device 106 itself, or on a combination of both.

The application may provide access to resources such as files, streaming media, and/or other applications. Resources may also be available in different versions presented in different respective languages. The user 108 may use the interface 110 of the application to access the resources. In some cases, the user 108 may locate resources by entry of a query in the search bar 112 of the interface 110. The system 102 may execute the search and return results in a window 150 of the interface 110. The results may include indications of resources, such as a hyperlink or icon that will allow the user 108 to activate, launch, stream, or otherwise access the resource.

The user 108 may search for resources by entering a name or keyword associated with or otherwise indicative of the resource into the search bar 112. Typically, the user 108 may search for the resource using a query entered in the same language as that of the application in use. In some cases, however, the user 108 may enter a name or keyword in a second language different from the language of the application and/or interface 110. The user 108 may do so because the second-language name is easier to remember and/or easier to enter. In such cases, the system 102 may not locate the resource. The system 102 may search an index in the language of the interface 110, and not recognize the word and/or not return a relevant and/or useful result in that the results may bear no relation to the resource sought by the user.

In order to provide a useful result to a query entered in a language different from a language of the interface 110, the system 102, according to some aspects of the present disclosure, may perform the following operations. The resource delivery system 102 may, at a step 116, receive a query entered in a second language. The system 102 may receive the query via the application presenting the interface 110 in the first language. The second language may be different from the first language. The resource delivery system 102 may, at a step 118, search resources accessible to a second application to identify at least a first resource corresponding to the query. The second application may be in the second language; that is, the same language as the query. The resource delivery system 102 may, at a step 120, return an indication of the first resource to the interface 110 based at least in part on a result of the search. The indication of the first resource may indicate a version of the first resource presented in the first language; that is, in a language other than the language in which the query was entered.

In some implementations, the system 102 may perform additional searches in additional languages and/or search indices. For example, the system 102 may also perform a search in the first language based on the query. In such cases, the system 102 may search resources accessible to the first application to identify at least a second resource corresponding to the query. The system 102 may return an indication of the second resource. In some cases, the search results may include a ranked list of indications of resources and/or resource versions. In some cases, the search results may include resources identified by respective searches in both the first language and the second language.

In some implementations, the system 102 may perform an intermediate translation of a query. For example, the application may have a first-language version and a second-language version (e.g., Chinese and English, respectively). The user 108 may, however, enter a keyword in a third language; for example, French. The system 102 may determine that the query is in the third language, and translate the query into the second language to generate a translated query. The system 102 may search the resources accessible to the second version of the application to identify a resource corresponding to the translated query, and return an indication of the identified resource to the interface 110.

In some implementations, the system 102 may perform the translation of the query using a machine translation model. The system 102 may improve the performance of machine translations by using feedback based on user 108 selections of results. For example, the system 102 may receive from the interface 110 an indication of a selection of a result presented in the window 150. The results may include indications of resources identified by the search and returned to the interface 110. Based on a selection of a search result, the system 102 may modify the machine translation model to reflect an association or relationship between the query and the selected result. This may, for example, increase a weight or probability indicative of an association between the selected result and the query in the model.

In some implementations, the system 102 may identify a version of the resource in the second language (that is, the language of the query). In such cases, the system 102 may determine a resource ID of the resource. The system 102 may use the resource ID to identify a second version of the resource that is presented in the first language (that is, the language of the interface 110). Thus, the system 102 may return, for a query in the second language, an indication of a version of the resource in the first language.

In some implementations, the system 102 may perform similar operations to identify and return resources based on queries including an abbreviation. Analogous to performing a machine translation for a third-language query as described above, the system 102 may expand or truncate the abbreviation to generate an expanded or reduced query in the form of a string. The system 102 may perform the search based on the expanded or reduced query to identify a resource corresponding to the abbreviation.

FIG. 1B is a diagram illustrating second example operations of a resource delivery system 102 configured for cross-language search in accordance with some aspects of the present disclosure. The system 102 may be in communication via a computer network (not shown) with one or more client devices 106 associated with a respective user 108. As shown, a client device 106 may present an interface 110, such as a monitor, screen, or touchscreen for displaying information to the user 108. The interface 110 may show a search bar 112 and a window 150. As described above with reference to FIG. 1A, the resource delivery system 102 may provide access to different language versions of applications and/or resources via cross-language search.

For example, the resource delivery system 102 may, at a step 130, provide an interface 110 in a first language via a first application in a manner similar to that of the step 114 described above. The resource delivery system 102 may, at a step 132, receive a query entered in a second language different from the first language via the interface 110.

The system 102 may, at a step 134, translate the query from the second language into a different language to generate a translated query. In some implementations, the system 102 may determine that one or more keywords or names in the query are in a language other than the language of the interface 110. The system 102 may, for example, detect that the query is in a different language based on characters and/or words in the query. For example, the interface 110 may be presented in English while the query includes Japanese characters, or accents commonly used in, for example, Portuguese but not English. A word itself may be one recognizable by the system 102 as a word common in the second language but not the first language. In some implementations, the system 102 may also process metadata received with the query to identify the language of the query. Upon determining that the query was entered in a language other than the language of the interface, the system 102 may translate the query to generate the translated query.

The translated query may be in the first language, or in another language. For example, in some implementations, the system 102 and the application presenting the interface 110 may have an active language and a translation language. The active language may represent the language for input and output using the interface 110. The translation language may represent a native or primary language of the application. For example, a developer or team may have developed the application in English, and the same or different developers may have translated the application into different languages later. In this case, the translation language may be English. The translation language may represent a useful language for interpreting queries, identifying resources, and providing responses. Thus, in some implementations, the translated query may be in the translation language, which may or may not be the same as the first language of the interface or the second language of the original query. For example, a user using a Chinese interface of an application originally developed in English may enter a query in French. The system 102 may translate the query into English, perform a search based on the translated query to determine an English-language resource, and determine a Chinese-language resource corresponding to the English-language resource. The system 102 may return an indication of the Chinese-language resource. In some implementations, and as described previously, the system 102 may expand or truncate abbreviations prior to, or as part of, the translation process.

The system 102 may, at a step 136, search resources accessible by the application to identify at least a first resource that corresponds to the translated query. The system 102 may perform the search by using the translated query to search an index configured in the translation language. The index may indicate one or more resources that correspond to the translated query.

In some implementations, the system 102 may perform one or more additional searches leveraging one or more additional search indices that may represent additional languages. For example, in addition to translating the query and performing a search in the language of the translated query, the system 102 may perform a search using the untranslated query to search an index in the language of the query. The additional search may identify a resource version accessible to a second version of the application that is presented in the second language; that is, the language of the query. Based on a resource version identified by the search, the system 102 may use a resource ID to identify a resource version presented in the first language. The system 102 may include an indication of this resource version in its search results.

The system 102 may, at a step 138, return an indication of the first resource as well as indications of any additional identified resources to the interface 110. The indication of the first resource may correspond to, for example, a version of the resource presented in the first language. For example, the search using the translated query may identify a resource version presented in the translation language, which may or may not be the same as language in which the interface 110 is presented. The system 102 may, using a resource ID of the resource, identify a version of the resource presented in the first language. The system 102 may provide the indication of the first resource in the window 150 of the interface 110. The indication of the first resource may include a hyperlink or icon that will allow the user 108 to activate, launch, or otherwise access the resource. In some implementations, and as described above, the system 102 may refine a machine translation model used in performing the translation based on the user 108 selection of a result.

B. Network and Computing Environment

Figure 2:
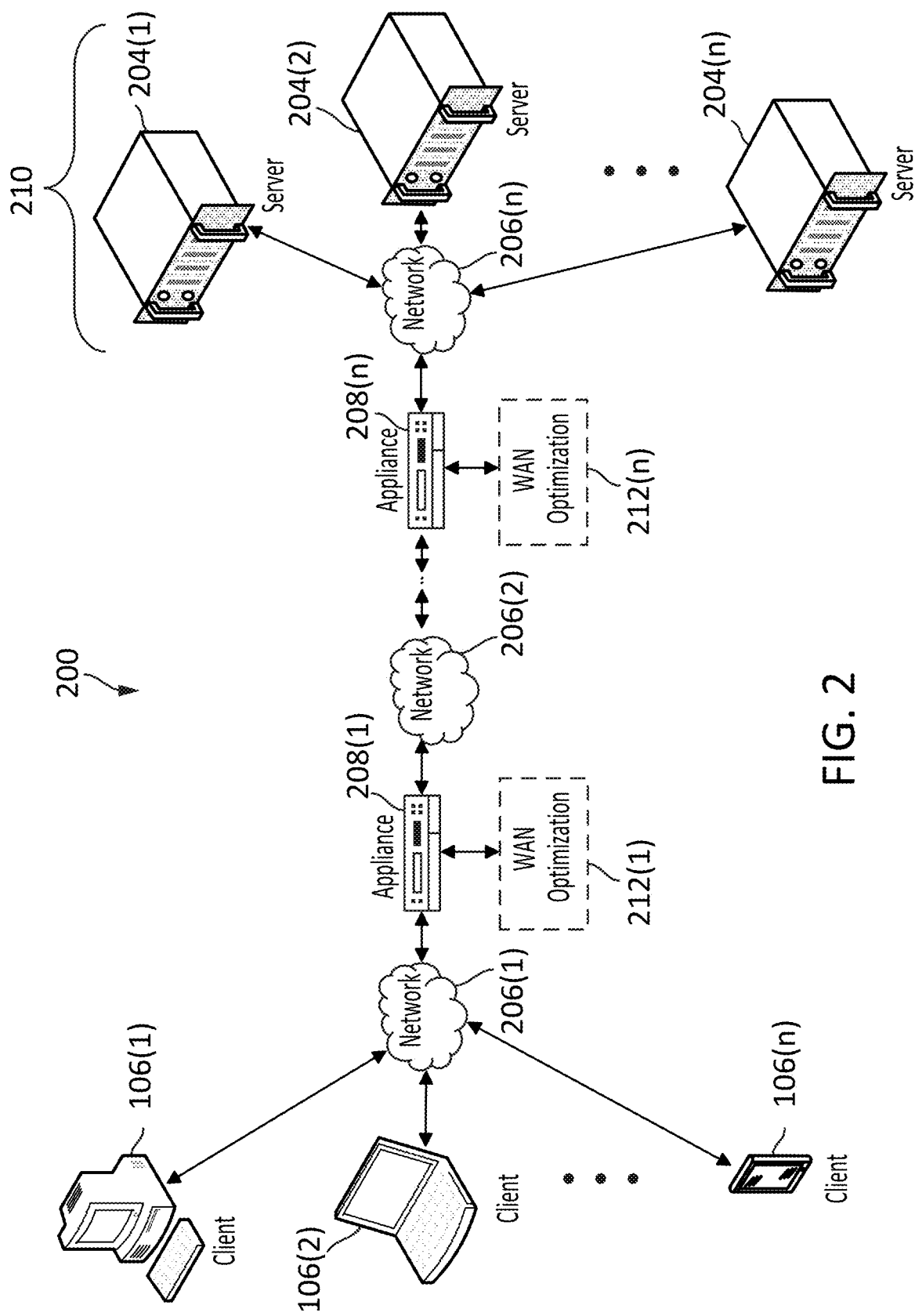
FIG. 2 is a diagram of a network computing environment.

FIG. 2 is a diagram of a network computing environment 200. As shown, the network environment 200 may include one or more clients 106(1)-106(n) (also generally referred to as local machine(s) 106 or client(s) 106) in communication with one or more servers 204(1)-204(n) (also generally referred to as remote machine(s) 204 or server(s) 204) via one or more networks 206(1)-206(n) (generally referred to as network(s) 206). The clients 106 may include, for example, the client device 106, and the servers 204 may, for example, include or make up the resource delivery system 102. In some embodiments, a client 106 may communicate with a server 204 via one or more appliances 208(1)-208(n) (generally referred to as appliance(s) 208 or gateway(s) 208).

Although the embodiment shown in FIG. 2 shows one or more networks 206 between the clients 106 and the servers 204, in other embodiments, the clients 106 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 106 and the servers 204. In some embodiments, each appliance 208 may act as a gateway between two or more networks. In other embodiments, one or more of the appliances 208 may instead be implemented in conjunction with or as part of a single one of the clients 106 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 106 and/or other servers 204. In some embodiments, as explained in more detail below, one or more server farms 210 may execute one or more applications on behalf of one or more of clients 106 (e.g., as a virtualization server system) and/or may facilitate the sharing of files between the clients 106 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

FIG. 3 illustrates an example of a computing system 300 that may be used to implement one or more of the respective components (e.g., the clients 106, the servers 204, and/or the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 106, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" may be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 106 shown in FIG. 2), may execute a virtual machine, which provides an execution session within which applications execute on behalf of a user or a client computing device (e.g., a client 106 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4A:
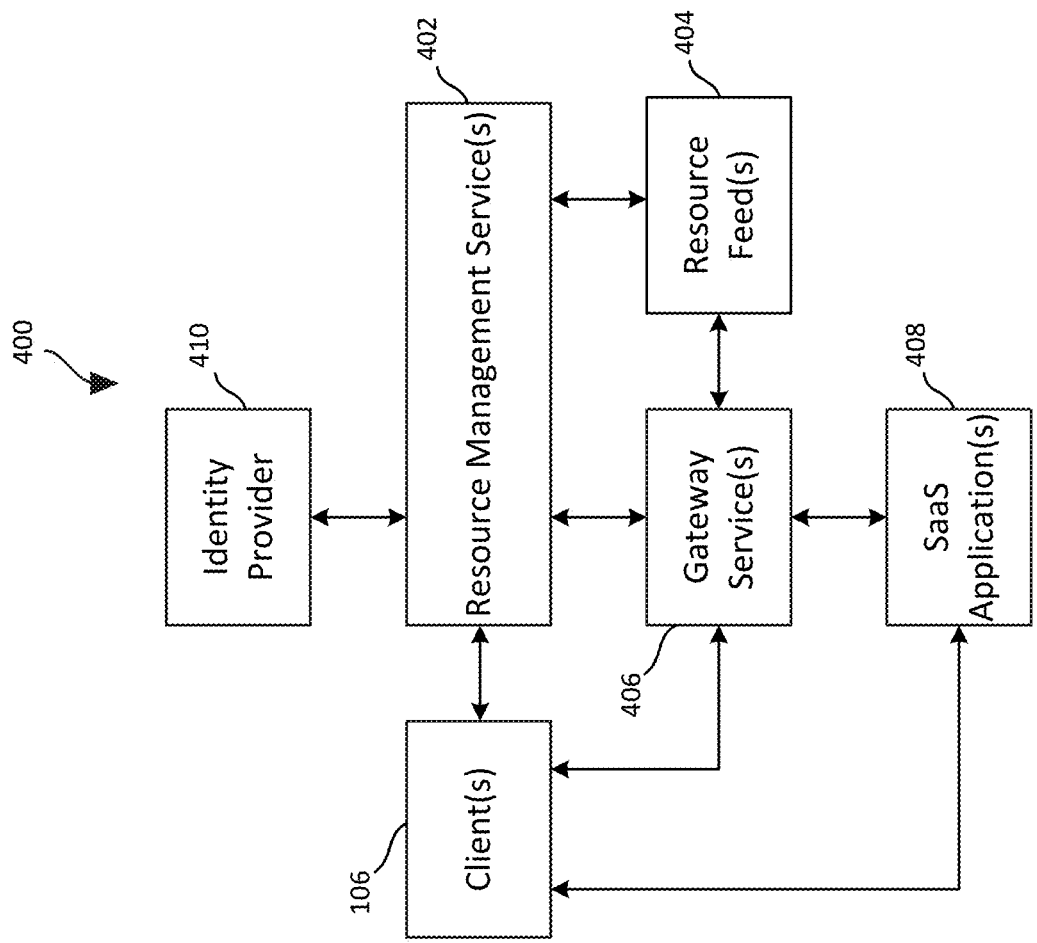
FIG. 4A is a block diagram of an example system in which resource management services may manage and streamline access by clients to resource feeds (via one or more gateway services) and/or software-as-a-service (SaaS) applications.

C. Systems and Methods for Managing and Streamlining Access by Client Devices to a Variety of Resources FIG. 4A is a block diagram of an example multi-resource access system 400 in which one or more resource management services 402 may manage and streamline access by one or more clients 106 to one or more resource feeds 404 (via one or more gateway services 406) and/or one or more software-as-a-service (SaaS) applications 408. In particular, the resource management service(s) 402 may employ an identity provider 410 to authenticate the identity of a user of a client 106 and, following authentication, identify one or more resources the user is authorized to access. In response to the user selecting one of the identified resources, the resource management service(s) 402 may send appropriate access credentials to the requesting client 106, and the client 106 may then use those credentials to access the selected resource. For the resource feed(s) 404, the client 106 may use the supplied credentials to access the selected resource via a gateway service 406. For the SaaS application(s) 408, the client 106 may use the credentials to access the selected application directly.

The client(s) 106 may be any type of computing devices capable of accessing the resource feed(s) 404 and/or the SaaS application(s) 408, and may, for example, include a variety of desktop or laptop computers, smartphones, tablets, etc. The resource feed(s) 404 may include any of numerous resource types and may be provided from any of numerous locations. In some embodiments, for example, the resource feed(s) 404 may include one or more systems or services for providing virtual applications and/or desktops to the client(s) 106, one or more file repositories and/or file sharing systems, one or more secure browser services, one or more access control services for the SaaS applications 408, one or more management services for local applications on the client(s) 106, one or more internet enabled devices or sensors, etc. The resource management service(s) 402, the resource feed(s) 404, the gateway service(s) 406, the SaaS application(s) 408, and the identity provider 410 may be located within an on-premises data center of an organization for which the multi-resource access system 400 is deployed, within one or more cloud computing environments, or elsewhere.

Figure 4B:
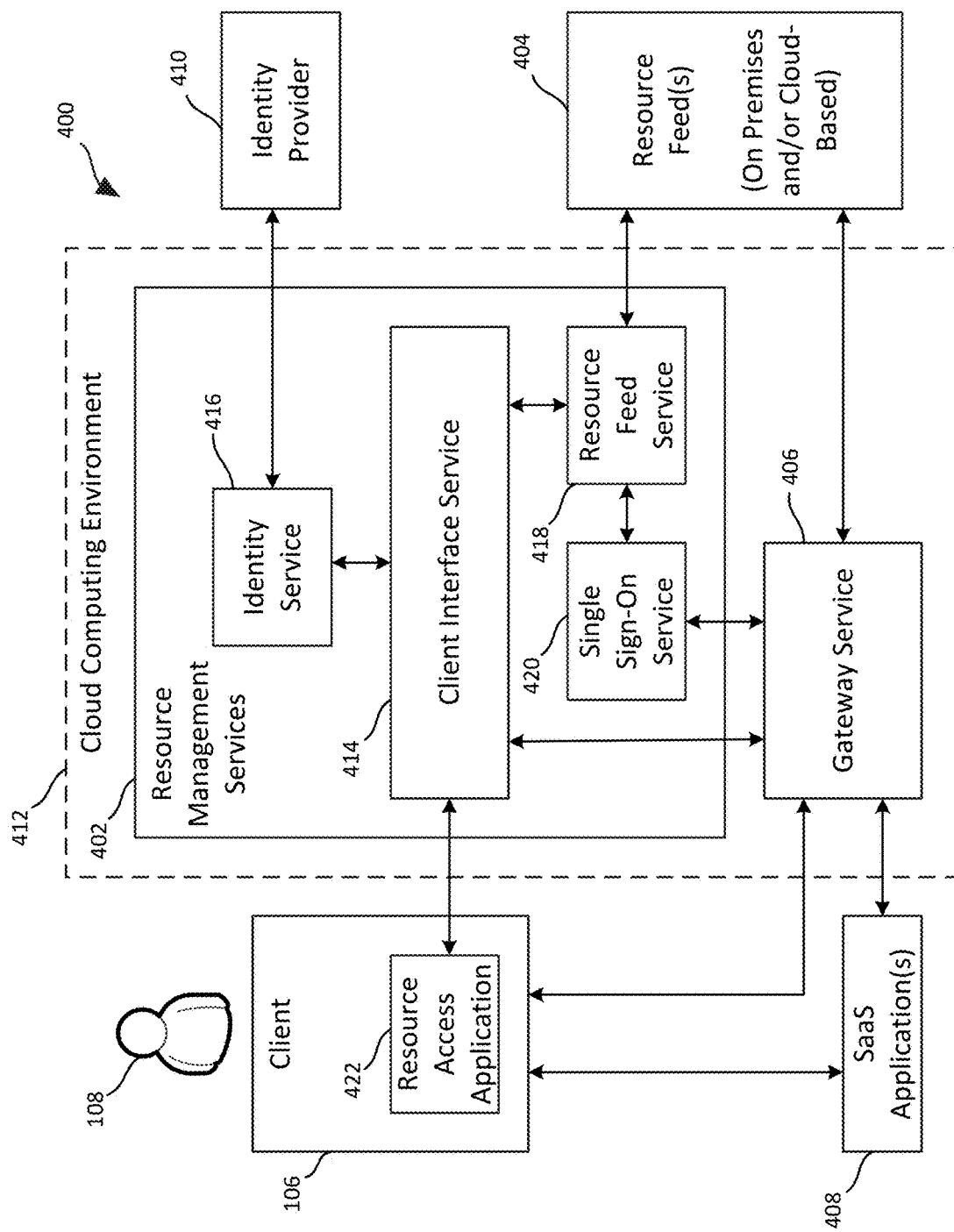
FIG. 4B is a block diagram showing an example implementation of the system shown in FIG. 4A in which various resource management services as well as a gateway service are located within a cloud computing environment.

FIG. 4B is a block diagram showing an example implementation of the multi-resource access system 400 shown in FIG. 4A in which various resource management services 402 as well as a gateway service 406 are located within a cloud computing environment 412. The cloud computing environment may, for example, include Microsoft Azure Cloud, Amazon Web Services, Google Cloud, or IBM Cloud. It should be appreciated, however, that in other implementations, one or more (or all) of the components of the resource management services 402 and/or the gateway service 406 may alternatively be located outside the cloud computing environment 412, such as within a data center hosted by an organization.

For any of the illustrated components (other than the client 106) that are not based within the cloud computing environment 412, cloud connectors (not shown in FIG. 4B) may be used to interface those components with the cloud computing environment 412. Such cloud connectors may, for example, run on Windows Server instances and/or Linux Server instances hosted in resource locations and may create a reverse proxy to route traffic between those resource locations and the cloud computing environment 412. In the illustrated example, the cloud-based resource management services 402 include a client interface service 414, an identity service 416, a resource feed service 418, and a single sign-on service 420. As shown, in some embodiments, the client 106 may use a resource access application 422 to communicate with the client interface service 414 as well as to present a user interface on the client 106 that a user 108 can operate to access the resource feed(s) 404 and/or the SaaS application(s) 408. The resource access application 422 may either be installed on the client 106, or may be executed by the client interface service 414 (or elsewhere in the multi-resource access system 400) and accessed using a web browser (not shown in FIG. 4B) on the client 106.

As explained in more detail below, in some embodiments, the resource access application 422 and associated components may provide the user 108 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 422 is launched or otherwise accessed by the user 108, the client interface service 414 may send a sign-on request to the identity service 416. In some embodiments, the identity provider 410 may be located on the premises of the organization for which the multi-resource access system 400 is deployed. The identity provider 410 may, for example, correspond to an on-premises Windows Active Directory. In such embodiments, the identity provider 410 may be connected to the cloud-based identity service 416 using a cloud connector (not shown in FIG. 4B), as described above. Upon receiving a sign-on request, the identity service 416 may cause the resource access application 422 (via the client interface service 414) to prompt the user 108 for the user's authentication credentials (e.g., username and password). Upon receiving the user's authentication credentials, the client interface service 414 may pass the credentials along to the identity service 416, and the identity service 416 may, in turn, forward them to the identity provider 410 for authentication, for example, by comparing them against an Active Directory domain. Once the identity service 416 receives confirmation from the identity provider 410 that the user's identity has been properly authenticated, the client interface service 414 may send a request to the resource feed service 418 for a list of subscribed resources for the user 108.

In other embodiments (not illustrated in FIG. 4B), the identity provider 410 may be a cloud-based identity service, such as a Microsoft Azure Active Directory. In such embodiments, upon receiving a sign-on request from the client interface service 414, the identity service 416 may, via the client interface service 414, cause the client 106 to be redirected to the cloud-based identity service to complete an authentication process. The cloud-based identity service may then cause the client 106 to prompt the user 108 to enter the user's authentication credentials. Upon determining the user's identity has been properly authenticated, the cloud-based identity service may send a message to the resource access application 422 indicating the authentication attempt was successful, and the resource access application 422 may then inform the client interface service 414 of the successfully authentication. Once the identity service 416 receives confirmation from the client interface service 414 that the user's identity has been properly authenticated, the client interface service 414 may send a request to the resource feed service 418 for a list of subscribed resources for the user 108.

The resource feed service 418 may request identity tokens for configured resources from the single sign-on service 420. The resource feed service 418 may then pass the feed-specific identity tokens it receives to the points of authentication for the respective resource feeds 404. The resource feeds 404 may then respond with lists of resources configured for the respective identities. The resource feed service 418 may then aggregate all items from the different feeds and forward them to the client interface service 414, which may cause the resource access application 422 to present a list of available resources on a user interface of the client 106. The list of available resources may, for example, be presented on the user interface of the client 106 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 106, and/or one or more SaaS applications 408 to which the user 108 has subscribed. The lists of local applications and the SaaS applications 408 may, for example, be supplied by resource feeds 404 for respective services that manage which such applications are to be made available to the user 108 via the resource access application 422. Examples of SaaS applications 408 that may be managed and accessed as described herein include Microsoft Office 365 applications, SAP SaaS applications, Workday applications, etc.

For resources other than local applications and the SaaS application(s) 408, upon the user 108 selecting one of the listed available resources, the resource access application 422 may cause the client interface service 414 to forward a request for the specified resource to the resource feed service 418. In response to receiving such a request, the resource feed service 418 may request an identity token for the corresponding feed from the single sign-on service 420. The resource feed service 418 may then pass the identity token received from the single sign-on service 420 to the client interface service 414 where a launch ticket for the resource may be generated and sent to the resource access application 422. Upon receiving the launch ticket, the resource access application 422 may initiate a secure session to the gateway service 406 and present the launch ticket. When the gateway service 406 is presented with the launch ticket, it may initiate a secure session to the appropriate resource feed and present the identity token to that feed to seamlessly authenticate the user 108. Once the session initializes, the client 106 may proceed to access the selected resource.

When the user 108 selects a local application, the resource access application 422 may cause the selected local application to launch on the client 106. When the user 108 selects a SaaS application 408, the resource access application 422 may cause the client interface service 414 to request a one-time uniform resource locator (URL) from the gateway service 406 as well a preferred browser for use in accessing the SaaS application 408. After the gateway service 406 returns the one-time URL and identifies the preferred browser, the client interface service 414 may pass that information along to the resource access application 422. The client 106 may then launch the identified browser and initiate a connection to the gateway service 406. The gateway service 406 may then request an assertion from the single sign-on service 420. Upon receiving the assertion, the gateway service 406 may cause the identified browser on the client 106 to be redirected to the logon page for identified SaaS application 408 and present the assertion. The SaaS may then contact the gateway service 406 to validate the assertion and authenticate the user 108. Once the user has been authenticated, communication may occur directly between the identified browser and the selected SaaS application 408, thus allowing the user 108 to use the client 106 to access the selected SaaS application 408.

In some embodiments, the preferred browser identified by the gateway service 406 may be a specialized browser embedded in the resource access application 422 (when the resource application is installed on the client 106) or provided by one of the resource feeds 404 (when the resource application 422 is located remotely), e.g., via a secure browser service. In such embodiments, the SaaS applications 408 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 106 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 404) for assessment of its security risk by a web filtering service. For approved URLs, the specialized browser may be permitted to access the link. For suspicious links, however, the web filtering service may have the client interface service 414 send the link to a secure browser service, which may start a new virtual browser session with the client 106, and thus allow the user to access the potentially harmful linked content in a safe environment.

In some embodiments, in addition to or in lieu of providing the user 108 with a list of resources that are available to be accessed individually, as described above, the user 108 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 106 to notify a user 108 of something that requires the user's attention (e.g., approval of an expense report, new course available for registration, etc.).

Figure 4C:
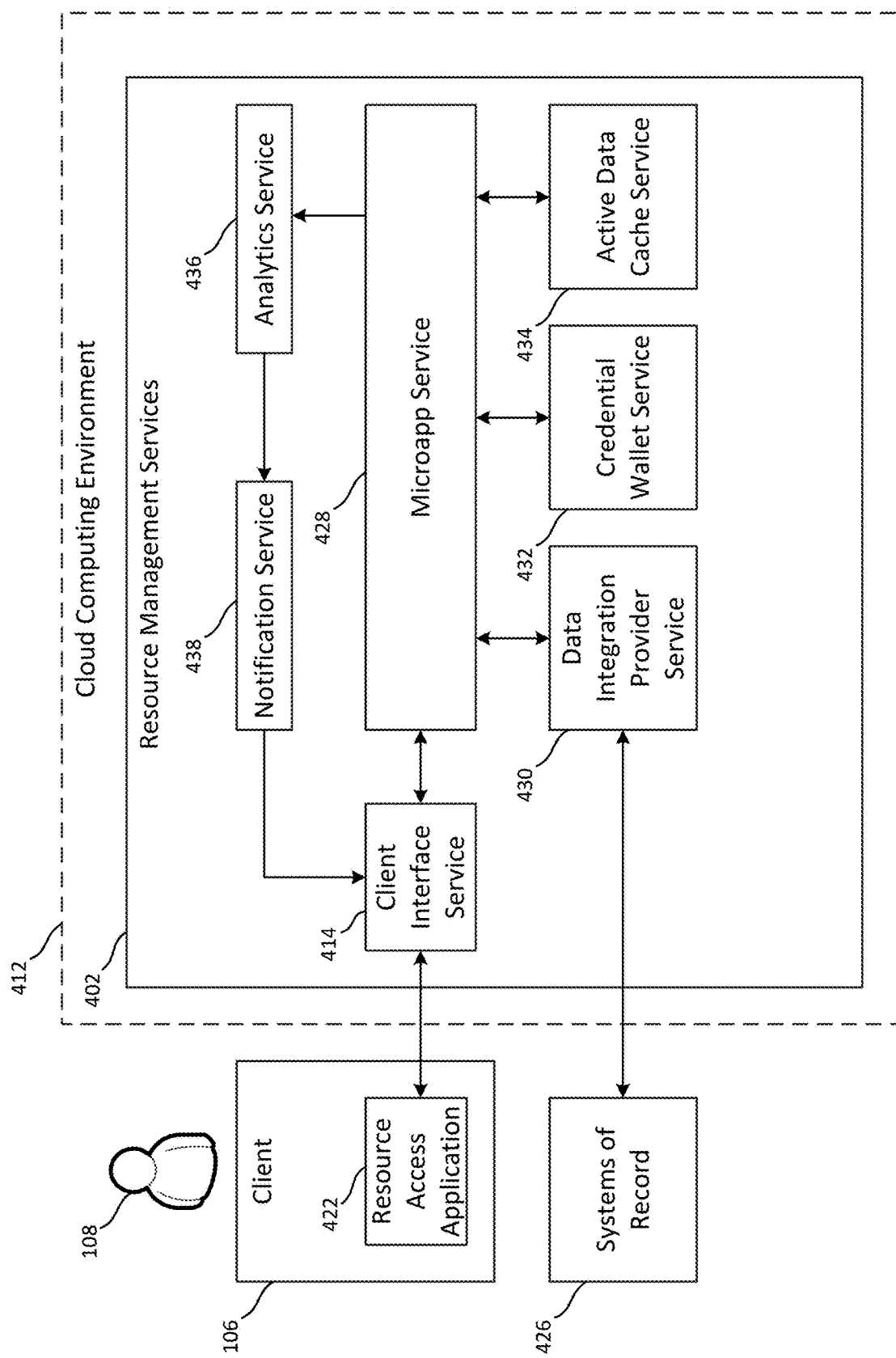
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 426 labeled "systems of record," and further in which several different services are included within the resource management services block 402. As explained below, the services shown in FIG. 4C may enable the provision of a streamlined resource activity feed and/or notification process for a client 106. In the example shown, in addition to the client interface service 414 discussed above, the illustrated services include a microapp service 428, a data integration provider service 430, a credential wallet service 432, an active data cache service 434, an analytics service 436, and a notification service 438. In various embodiments, the services shown in FIG. 4C may be employed either in addition to or instead of the different services shown in FIG. 4B. Further, as noted above in connection with FIG. 4B, it should be appreciated that, in other implementations, one or more (or all) of the components of the resource management services 402 shown in FIG. 4C may alternatively be located outside the cloud computing environment 412, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 422 without having to launch the native application. The system shown in FIG. 4C may, for example, aggregate relevant notifications, tasks, and insights, and thereby give the user 108 a dynamic productivity tool. In some embodiments, the resource activity feed may be intelligently populated by utilizing machine learning and artificial intelligence (AI) algorithms. Further, in some implementations, microapps may be configured within the cloud computing environment 412, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 426 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 430, may, for example, support REST API, JSON, OData-JSON, and XML. As explained in more detail below, the data integration provider service 430 may also write back to the systems of record, for example, using OAuth2 or a service account.

In some embodiments, the microapp service 428 may be a single-tenant service responsible for creating the microapps. The microapp service 428 may send raw events, pulled from the systems of record 426, to the analytics service 436 for processing. The microapp service may, for example, periodically pull active data from the systems of record 426.

In some embodiments, the active data cache service 434 may be single-tenant and may store all configuration information and microapp data. It may, for example, utilize a per-tenant database encryption key and per-tenant database credentials.

In some embodiments, the credential wallet service 432 may store encrypted service credentials for the systems of record 426 and user OAuth2 tokens.

In some embodiments, the data integration provider service 430 may interact with the systems of record 426 to decrypt end-user credentials and write back actions to the systems of record 426 under the identity of the end-user. The write-back actions may, for example, utilize a user's actual account to ensure all actions performed are compliant with data policies of the application or other resource being interacted with.

In some embodiments, the analytics service 436 may process the raw events received from the microapps service 428 to create targeted scored notifications and send such notifications to the notification service 438.

Finally, in some embodiments, the notification service 438 may process any notifications it receives from the analytics service 436. In some implementations, the notification service 438 may store the notifications in a database to be later served in an activity feed. In other embodiments, the notification service 438 may additionally or alternatively send the notifications out immediately to the client 106 as a push notification to the user 108.

In some embodiments, a process for synchronizing with the systems of record 426 and generating notifications may operate as follows. The microapp service 428 may retrieve encrypted service account credentials for the systems of record 426 from the credential wallet service 432 and request a sync with the data integration provider service 430. The data integration provider service 430 may then decrypt the service account credentials and use those credentials to retrieve data from the systems of record 426. The data integration provider service 430 may then stream the retrieved data to the microapp service 428. The microapp service 428 may store the received systems of record data in the active data cache service 434 and also send raw events to the analytics service 436. The analytics service 436 may create targeted scored notifications and send such notifications to the notification service 438. The notification service 438 may store the notifications in a database to be later served in an activity feed and/or may send the notifications out immediately to the client 106 as a push notification to the user 108.

In some embodiments, a process for processing a user-initiated action via a microapp may operate as follows. The client 106 may receive data from the microapp service 428 (via the client interface service 414) to render information corresponding to the microapp. The microapp service 428 may receive data from the active data cache service 434 to support that rendering. The user 108 may invoke an action from the microapp, causing the resource access application 422 to send an action request to the microapp service 428 (via the client interface service 414). The microapp service 428 may then retrieve from the credential wallet service 432 an encrypted Oauth2 token for the system of record for which the action is to be invoked, and may send the action to the data integration provider service 430 together with the encrypted OAuth2 token. The data integration provider service 430 may then decrypt the OAuth2 token and write the action to the appropriate system of record under the identity of the user 108. The data integration provider service 430 may then read back changed data from the written-to system of record and send that changed data to the microapp service 428. The microapp service 428 may then update the active data cache service 434 with the updated data and cause a message to be sent to the resource access application 422 (via the client interface service 414) notifying the user 108 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistant through either the resource access application 422 or directly from another resource, such as Microsoft Teams. This feature may allow employees to work efficiently, stay organized, and deliver only the specific information they're looking for.

Figure 4D:
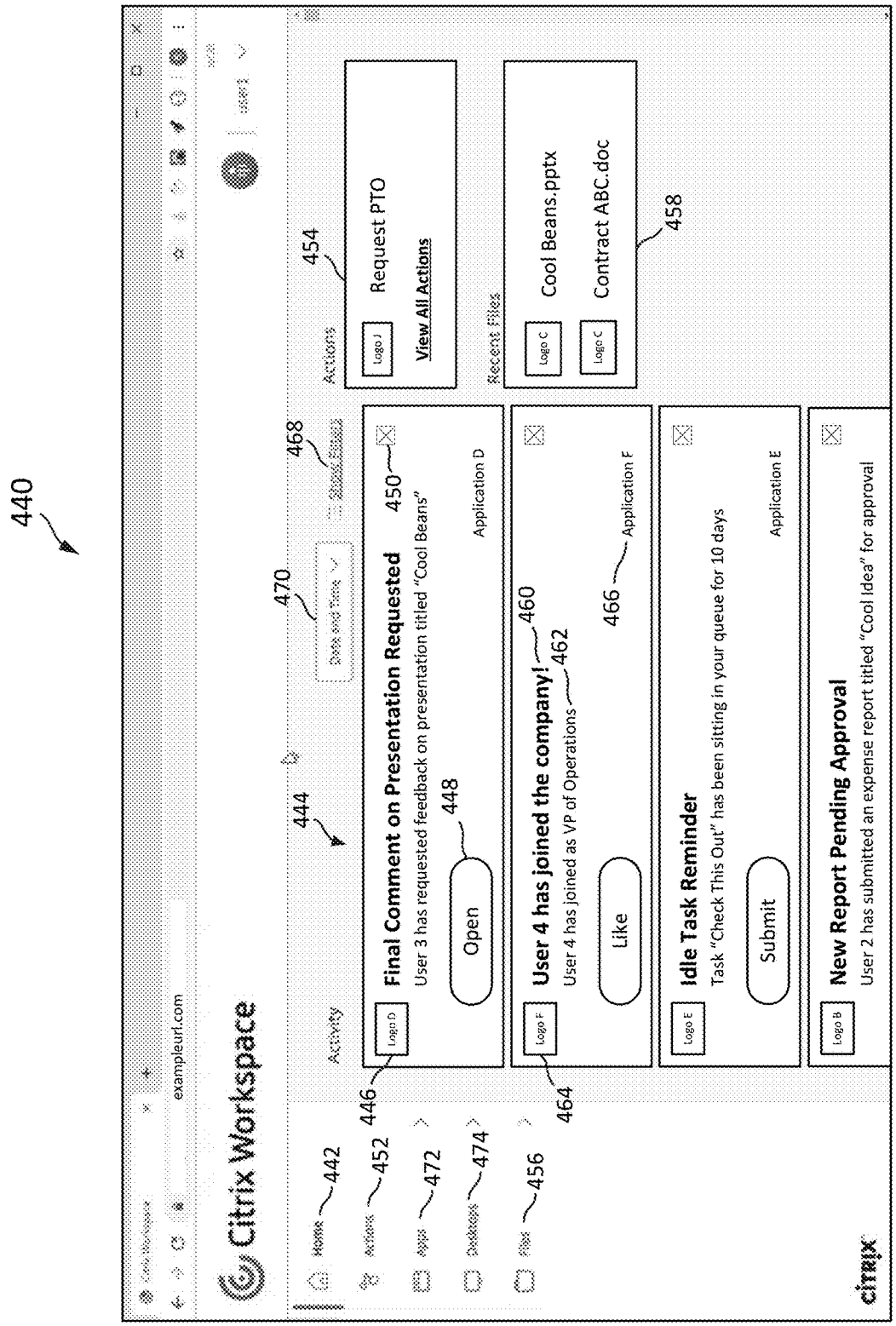
FIG. 4D shows how a display screen may appear when an intelligent activity feed feature of a multi-resource management system, such as that shown in FIG. 4C, is employed.

FIG. 4D shows how a display screen 440 presented by a resource access application 422 (shown in FIG. 4C) may appear when an intelligent activity feed feature is employed and a user is logged on to the system. Such a screen may be provided, for example, when the user clicks on or otherwise selects a "home" user interface element 442. As shown, an activity feed 444 may be presented on the screen 440 that includes a plurality of notifications 446 about respective events that occurred within various applications to which the user has access rights. An example implementation of a system capable of providing an activity feed 444 like that shown is described above in connection with FIG. 4C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 446 to the user concerning actions that the user can take relating to such events. As shown in FIG. 4D, in some implementations, the notifications 446 may include a title 460 and a body 462, and may also include a logo 464 and/or a name 466 of the system or record to which the notification 446 corresponds, thus helping the user understand the proper context with which to decide how best to respond to the notification 446. In some implementations, one or more filters may be used to control the types, date ranges, etc., of the notifications 446 that are presented in the activity feed 444. The filters that can be used for this purpose may be revealed, for example, by clicking on or otherwise selecting the "show filters" user interface element 468. Further, in some embodiments, a user interface element 470 may additionally or alternatively be employed to select a manner in which the notifications 446 are sorted within the activity feed. In some implementations, for example, the notifications 446 may be sorted in accordance with the "date and time" they were created (as shown for the element 470 in FIG. 4D), a "relevancy" mode (not illustrated) may be selected (e.g. using the element 470) in which the notifications may be sorted based on relevancy scores assigned to them by the analytics service 436, and/or an "application" mode (not illustrated) may be selected (e.g., using the element 470) in which the notifications 446 may be sorted by application type.

When presented with such an activity feed 444, the user may respond to the notifications 446 by clicking on or otherwise selecting a corresponding action element 448 (e.g., "Approve," "Reject," "Open," "Like," "Submit," etc.), or else by dismissing the notification, e.g., by clicking on or otherwise selecting a "close" element 450. As explained in connection with FIG. 4C below, the notifications 446 and corresponding action elements 448 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 446 (e.g., in a separate, pop-up window corresponding to the microapp) by clicking on or otherwise selecting a portion of the notification 446 other than one of the user-interface elements 448, 450. In some embodiments, the user may additionally or alternatively be able to select a user interface element either within the notification 446 or within a separate window corresponding to the microapp that allows the user to launch the native application to which the notification relates and respond to the event that prompted the notification via that native application rather than via the microapp. In addition to the event-driven actions accessible via the action elements 448 in the notifications 446, a user may alternatively initiate microapp actions by selecting a desired action, e.g., via a drop-down menu accessible using the "action" user-interface element 452 or by selecting a desired action from a list 454 of recently and/or commonly used microapp actions. As shown, additional resources may also be accessed through the screen 440 by clicking on or otherwise selecting one or more other user interface elements that may be presented on the screen. For example, in some embodiments, the user may also access files (e.g., via a Citrix ShareFile™ platform) by selecting a desired file, e.g., via a drop-down menu accessible using the "files" user interface element 456 or by selecting a desired file from a list 458 of recently and/or commonly used files. Further, in some embodiments, one or more applications may additionally or alternatively be accessible (e.g., via a Citrix Virtual Apps and Desktops™ service) by clicking on or otherwise selecting an "apps" user-interface element 472 to reveal a list of accessible applications or by selecting a desired application from a list (not shown in FIG. 4D but similar to the list 458) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user-interface element 474 to reveal a list of accessible desktops or by or by selecting a desired desktop from a list (not shown in FIG. 4D but similar to the list 458) of recently and/or commonly used desktops.

The activity feed shown in FIG. 4D provides significant benefits, as it allows a user to respond to application-specific events generated by disparate systems of record without needing to navigate to, launch, and interface with multiple different native applications.

D. Detailed Description of Example Embodiments of a Resource Delivery System

Figure 5:
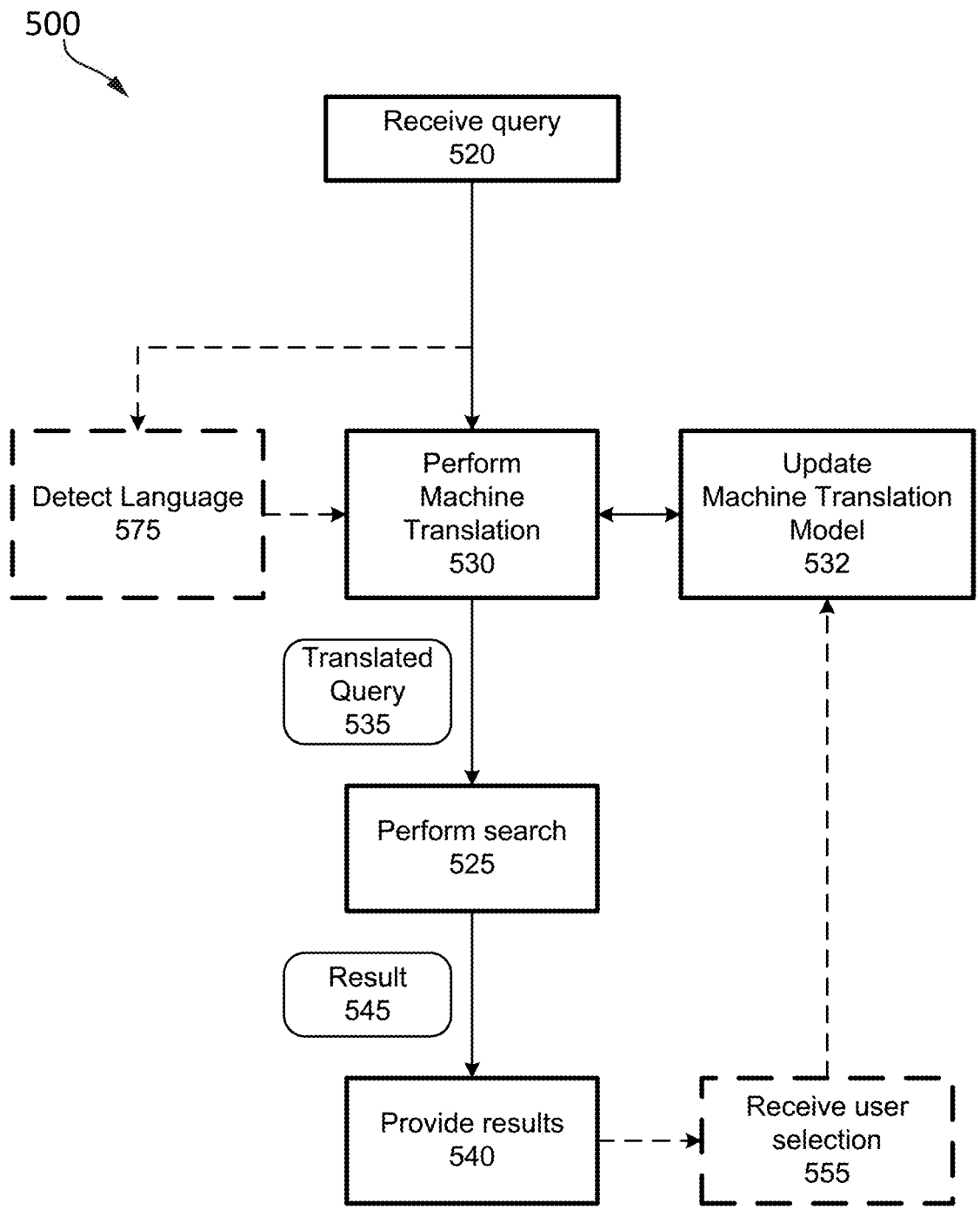
FIG. 5 is a flowchart illustrating first example operations for cross-language search in accordance with the present disclosure.

FIG. 5 is a flowchart illustrating first example operations 500 for cross-language search in accordance with some aspects of the present disclosure. The system 102 may cause an interface 110 to be presented on, for example, a display of a client device such as the client device 106 previously described. In some implementations, various operations described with respect to the client device 106 and/or the system 102 may be executed on one or more client devices 106, one or more systems 102, or combinations thereof. The interface 110 may include a search bar 112 and a window 150 in addition to other graphical elements. The interface 110 may be presented by, for example, an application. The application may be available in different languages; e.g., different applications may present the interface 110 in different languages. Using the interface 110, a user 108 may be able to locate resources such as files, media, additional applications, etc. The resources themselves may be available in different languages. The user 108 may locate resources by entering a query in to the search bar 112. The system 102 may return one or more search results in the window 150. The search results may include an indication of a resource. In various implementations, operations described with respect to the system 102 may be performed in whole or in part on the client device 106, and vice-versa.

In some cases, the user 108 may use an interface 110 presented in a first language to enter a query in a second language. The system 102 may, at a step 520, receive the query. The system 102 may, at a step 530, perform machine translation of the query to generate a translated query 535. The translated query 535 may be in the first language (that is, the language of the interface 110) or in another, intermediate language representing a translation language of the application presenting the interface 110. In some implementations, the system 102 may, at a step 575, detect a language of the query.

The system 102 may identify a language of the query based on the query itself and/or metadata associated with the query. The query may include special characters unique to a particular language. One or more keywords present in the query may be unique to, or more prevalent in, a particular language, and may this indicate a language of the query. The metadata associated with the query may yield additional clues about or otherwise indicate the language of the query. For example, the metadata may include information about the client device 106 including software and/or hardware features, location, and/or input and output settings. The system 102 may use this information to identify a language of the query, and use the detected language information to perform the machine translation.

The system 102 may, at a step 525, perform a search using, for example, a search engine to search an index. The index may be configured in the translation language and/or the first language. The search engine may identify one or more resources corresponding to the translated query 535 by comparing contents of the query against entries in the index. In doing so, the search engine may identify resource versions presented in the first language. For example, the index may be configured with entries corresponding to various names, keywords, and/or phrases related to different resource identifiers (IDs). By comparing content of the translated query 535, the search engine may identify one or more resource IDs associated with the content of the translated query 535. In some cases, the system 102 may use the resource ID to identify a resource or a resource version in the first language; that is, the language of the interface 110 and/or application. In some cases, the different language resources or resource versions may have the same resource ID. In some cases, the system 102 may determine a resource ID for a first-language resource based on the resource ID for the second-language resource using, for example, a lookup table. The system 102 may, at a step 540, return an indication of one or more identified resource versions as results 545 for display, for example, in the window 150 of the interface 110.

In some implementations, the system 102 may implement a feedback mechanism to refine operation of the machine translation. For example, the system 102 may, at a step 555, receive an indication of a user selection of a result previously provided to the window 150. The search results may include indications of resources identified by the search and returned to the interface 110. Based on a selection of a search result, the system 102 may, at a step 532, modify the machine translation model or other data used for performing the machine translation to reflect an association between the search query and the selected search result. This may, for example, increase a weight or probability indicative of an association or relationship between the selected result and the query as represented in the model.

Various components of the system 102, including the machine translation component, search engine, search index, machine translation model, and language detection component may be implemented as logic and/or software, including memory and/or storage elements (i.e., one or more computer-readable mediums encoded with instructions which, when executed by one or more processors, cause one or more computing components including such processor(s) to perform the functions described herein).

Figure 6:
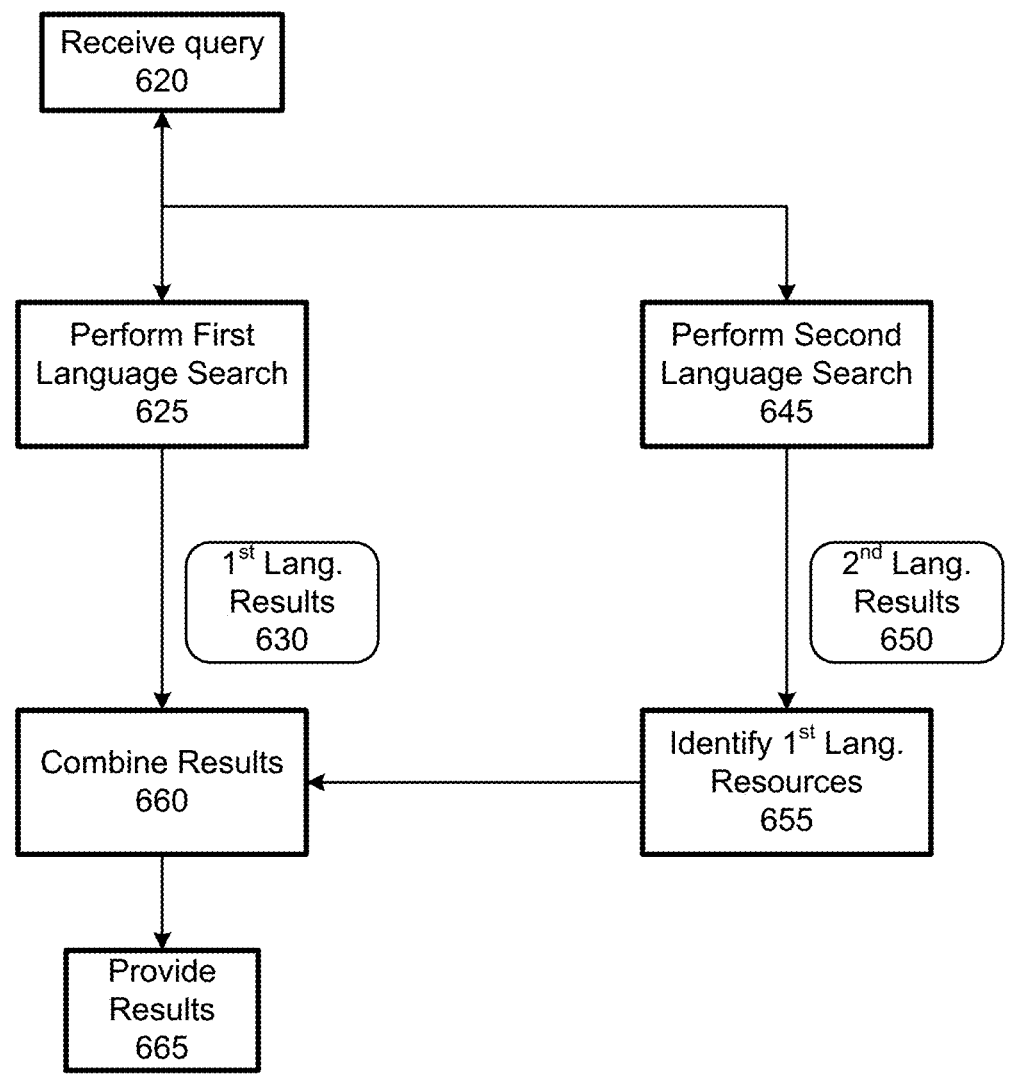
FIG. 6 is a flowchart illustrating second example operations for cross-language search in accordance with the present disclosure.

FIG. 6 is a flowchart illustrating second example operations 600 for cross-language search in accordance with some aspects of the present disclosure. In the example shown in FIG. 6, the system 102 may perform searches in multiple languages based on a query. For example, the system 102 may perform a first language search using a first language search index, and a second language search using a second language search index. The first language search and the second language search may be performed by the same or separate search engines. The first language may be, for example, an active language in which the interface 110 is presented. The second language may represent a translation language, such as a native or alternative language of an application that is presenting the interface 110. The second language may represent a detected language of the query detected by, for example, a language detection component. In various implementations, operations described with respect to the system 102 may be performed in whole or in part on the client device 106, and vice-versa.

The system 102 may, at a step 620, receive a query; for example, from the interface 110. The system 102 may, at a step 625, perform a first language search and identify first language results 630. The system 102 may, at a step 645, perform a second language search to identify second language results 650. The first language results 630 may include resources in the language of the interface 110. The second language results 650, however, may include resources in the second language. Thus, the system 102 may, at a step 655, identify first language resources corresponding to the second language results 650. For example, the system 102 may use a resource ID of the resource version identified in the second language results 650 to identify a resource presented in the first language. The system 102 may, at a step 660, combine the first language results 630 and the second language results 650 to yield combined search results. The combined search results may include one or more indications of resources presented in the first language; that is, the language of the interface 110. The system 102 may, at a step 665, return the combined search results for presentation; for example, in the window 150.

Figure 7:
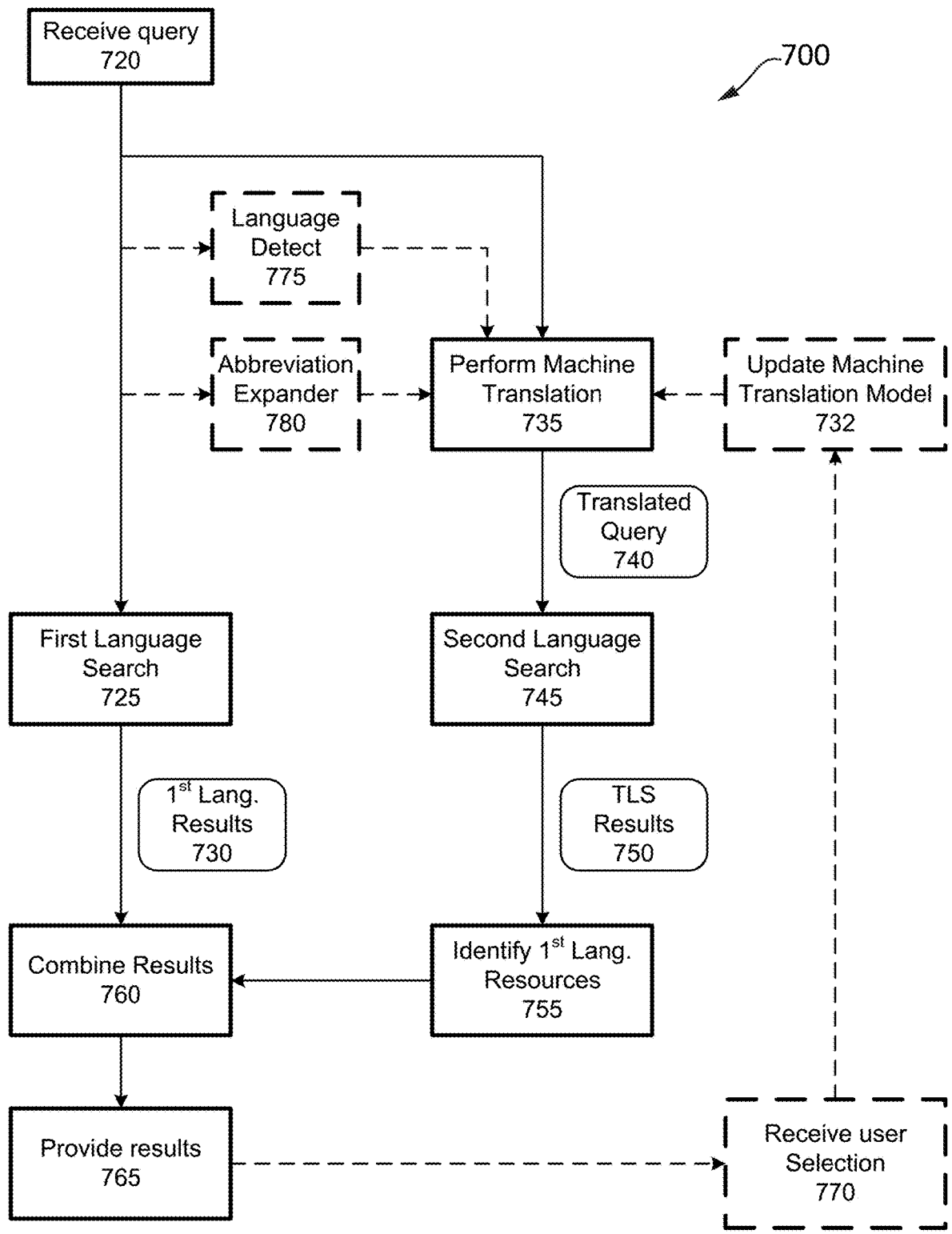
FIG. 7 is a flowchart illustrating third example operations for cross-language search in accordance with the present disclosure.

FIG. 7 is a flowchart illustrating third example operations 700 for cross-language search in accordance with some aspects of the present disclosure. FIG. 7 illustrates how the system 102 may perform a search of the search query in the first language as well as a search of a translated query. The system 102 may translate the query into the second language; or, alternatively, the system 102 may translate the query into a third language. The system 102 may, at a step 720, receive a query. The query may be received, for example, from an interface 110 and/or application presented in a first language, while the query may be in a second language. The system 102 may, at a step 735, perform a machine translation of the query to generate a translated query 740. The system 102 may, at a step 745, perform a search in the second language; for example, the system 102 may search a second-language index for entries similar to content in the translated query 740. The system 102 may, at a step 755, use the translation language search (TLS) results 750 to identify one or more first-language resources.

The system 102 may, at a step 725, perform a search in the first language; for example, the system 102 may search a first-language index for entries similar to content in the query received at the step 720. The system 102 may thereby generate first-language results 730. The system 102 may, at a step 760, combine the first-language results 730 and the first-language resources identified at the step 755. In some implementations, the system 102 may, at a step 765, provide the results, for example, presenting indications of the identified resources to a window 150.

FIG. 7 further illustrates how data such as a machine translation model used by the machine translation may be refined based on a user selection of a result. Based on a user selection, the system 102 may modify the machine translation model to reflect an association between the query and the selected result. This may, for example, increase a weight or probability indicative of an association between the selected result and the query in the machine translation model. In some implementations, the system 102 may, at a step 770, receive an indication of a user selection of a result. The results may include indications of resources identified by the search and returned to the interface 110. Based on the indication of the selection, the system 102 may, at a step 732, modify the machine translation model or other data used for performing the machine translation to reflect an association between the query and the selected result. This may, for example, increase a weight or probability indicative of an association or relationship between the selected result and the query as represented in the model.

FIG. 7 further illustrates how the system 102 may use a language detection component to determine a language of the query. In some implementations, the system 102 may, at a step 775, detect a language of the query. The system 102 may then translate the query using information regarding the detected language.

FIG. 7 further illustrates how the system 102 may expand abbreviations to aid in handling queries that may include an abbreviation. An abbreviation may consist of a short string of characters meant to represent a longer string of characters. The user 108 may enter abbreviations in the query to save time/energy. The machine translation component (and/or language detection component) may have difficulty recognizing an abbreviation as representing any particular language or any particular meaning. Therefore, in some implementations, the system 102 may, at a step 780, recognize the abbreviation and modify the query to replace the abbreviation with an expanded string represented by the abbreviation to generate an expanded query. The expanded query may then be provided to the language detection, machine translation and/or search processes.

In various implementations, the operations described in Section D with respect to the resource delivery system 102 may be performed on the client device 106, and vice versa. The operations may be functionality of a single application or multiple applications. Similarly, the delivered resources may be functions of the application itself and/or other applications, which may reside on the client device 106, the resource delivery system 102, or a combination of both.

E. Example Implementations of Methods, Systems, and Computer-Readable Media in Accordance with the Present Disclosure The following paragraphs (M1) through (M13) describe examples of methods that may be implemented in accordance with the present disclosure.

(M1) A method may be performed that involves receiving, by a computing system and via a first application presenting an interface in a first language, a first query entered in a second language different from the first language; searching, by the computing system, resources accessible to a second application to identify at least a first resource corresponding to the first query, the second application being in the second language; and returning, to the interface and based at least in part on a result of the searching, an indication of the first resource.

(M2) A method may be performed as described in paragraph (M1), wherein the first resource is in the first language.

(M3) A method may be performed as described in paragraph (M1) or paragraph (M2), and may further involve searching, by the computing system, resources accessible to the first application to identify at least a second resource corresponding to the first query; and returning an indication of the second resource to the interface.

(M4) A method may be performed as described in any of paragraphs (M1) through (M3), and may further involve determining, based on the searching, a resource identifier corresponding to a first version of the first resource, the first version being in the second language; and determining, based on the resource identifier, a second version of the first resource, the second version being in the first language and wherein returning the indication of the first resource includes returning an indication of the second version.

(M5) A method may be performed as described in any of paragraphs (M1) through (M4), and may further involve translating, prior to the searching, the first query to determine a translated query, wherein the searching is performed using the translated query; receiving an indication of a selection of a search result; and modifying data used when performing the translating to reflect an association between the first query and the search result.

(M6) A method may be performed as described in any of paragraphs (M1) through (M5), and may further involve the searching identifies a first version of the first resource presented in the second language, and the indication of the first resource is an indication of a second version of the first resource presented in the first language.

(M7) A method may be performed as described in any of paragraphs (M1) through (M6), and may further involve determining that the first query represents an abbreviation; and expanding the abbreviation to generate an expanded query, wherein the searching identifies the first resource as corresponding to the expanded query.

(M8) A method may be performed that involves receiving, by a computing system and via an application presenting an interface in a first language, a query entered in a second language different from the first language; translating, by the computing system, the query from the second language into a different language to generate a translated query; searching, by the computing system, resources accessible by the application to identify at least a first resource that corresponds to the translated query; and returning, to the interface and based at least in part on a result of the searching, an indication of the first resource, wherein the first resource is presented in the first language.

(M9) A method may be performed as described in paragraph (M8), wherein translating the query includes translating the query into the first language.

(M10) A method may be performed as described in paragraph (M8) or paragraph (M9), wherein searching the resources accessible by the application includes searching resources presented in the first language and accessible by the application, wherein identifying the first resource that corresponds to the translated query includes identifying a first version of the first resource in a same language as the translated query, and wherein the method may further involve determining a resource identifier corresponding to the first version of the first resource; and determining, based on the resource identifier, a second version of the first resource presented in the first language, wherein returning the indication of the first resource includes returning an indication of the second version of the first resource.

(M11) A method may be performed as described in any of paragraphs (M8) through (M10), and may further involve determining that the query represents an abbreviation; determining a string represented by the abbreviation; and translating the string to determine the translated query.

(M12) A method may be performed as described in any of paragraphs (M8) through (M11), wherein the searching resources accessible by the application includes searching resources accessible by a first version of the application, wherein the first version of the application presented in the first language, and wherein the method may further involve: searching, by the computing system, resources accessible by a second version of the application to identify at least a second resource that corresponds to the query, the second version of the application presented in the second language; and returning an indication of the second resource to the interface.

(M13) A method may be performed as described in any of paragraphs (M8) through (M12), and may further involve receiving an indication of a selection of a search result; and modifying a model used when performing the translating to reflect an association between the query and the search result.

The following paragraphs (S1) through (S13) describe examples of systems and devices that may be implemented in accordance with the present disclosure.

(S1) A system may comprise a computing system includes at least one processor and at least one computer-readable medium. The at least one computer-readable medium may be encoded with instructions which, when executed by the at least one processor, cause the computing system to receive, via a first application presenting an interface in a first language, a first query entered in a second language different from the first language; search resources accessible to a second application to identify at least a first resource corresponding to the first query, the second application being in the second language; and return, to the interface and based at least in part on a result of the searching, an indication of the first resource.

(S2) A system may be configured as described in paragraph (S1), wherein the first resource is in the first language.

(S3) A system may be configured as described in paragraph (S1) or paragraph (S2), wherein the at least one computer-readable medium may be further encoded with additional instructions which, when executed by the at least one processor, further cause the computing system to search resources accessible to the first application to identify at least a second resource corresponding to the first query; and return an indication of the second resource to the interface.

(S4) A system may be configured as described in any of paragraphs (S1) through (S3), wherein the at least one computer-readable medium may be further encoded with additional instructions which, when executed by the at least one processor, further cause the computing system to determine, based on the search, a resource identifier corresponding to a first version of the first resource, the first version being in the second language; and determine, based on the resource identifier, a second version of the first resource, the second version being in the first language and wherein returning the indication of the first resource includes returning an indication of the second version.

(S5) A system may be configured as described in any of paragraphs (S1) through (S4), wherein the at least one computer-readable medium may be further encoded with additional instructions which, when executed by the at least one processor, further cause the computing system to translate, prior to the search, the first query to determine a translated query, wherein the search is performed using the translated query; receive an indication of a selection of a search result; and modify data used when performing the translating to reflect an association between the first query and the search result.

(S6) A system may be configured as described in any of paragraphs (S1) through (S5), wherein the search identifies a first version of the first resource presented in the second language, and the indication of the first resource is an indication of a second version of the first resource presented in the first language.

(S7) A system may be configured as described in any of paragraphs (S1) through (S6), wherein the at least one computer-readable medium may be further encoded with additional instructions which, when executed by the at least one processor, further cause the computing system to determine that the first query represents an abbreviation; and expand the abbreviation to generate an expanded query, wherein the search identifies the first resource as corresponding to the expanded query.

(S8) A system may comprise a computing system includes at least one processor and at least one computer-readable medium. The at least one computer-readable medium may be encoded with instructions which, when executed by the at least one processor, cause the computing system to receive, via an application presenting an interface in a first language, a query entered in a second language different from the first language; translate the query from the second language into a different language to generate a translated query; search resources accessible by the application to identify at least a first resource that corresponds to the translated query; and return, to the interface and based at least in part on a result of the searching, an indication of the first resource, wherein the first resource is presented in the first language.

(S9) A system may be configured as described in paragraph (S8), wherein translating the query includes translating the query into the first language.

(S10) A system may be configured as described in paragraph (S8) or paragraph (S9), wherein searching the resources accessible by the application includes searching resources presented in the first language and accessible by the application, wherein identifying the first resource that corresponds to the translated query includes identifying a first version of the first resource in a same language as the translated query, and wherein the at least one computer-readable medium may be further encoded with additional instructions which, when executed by the at least one processor, further cause the computing system to determine a resource identifier corresponding to the first version of the first resource; and determine, based on the resource identifier, a second version of the first resource presented in the first language, wherein returning the indication of the first resource includes returning an indication of the second version of the first resource.

(S11) A system may be configured as described in any of paragraphs (S8) through (S10), wherein the at least one computer-readable medium may be further encoded with additional instructions which, when executed by the at least one processor, further cause the computing system to determine that the query represents an abbreviation; determine a string represented by the abbreviation; and translate the string to determine the translated query.

(S12) A system may be configured as described in any of paragraphs (S8) through (S11), wherein the searching resources accessible by the application includes searching resources accessible by a first version of the application, the first version of the application presented in the first language, and wherein the at least one computer-readable medium may be further encoded with additional instructions which, when executed by the at least one processor, further cause the computing system to search resources accessible by a second version of the application to identify at least a second resource that corresponds to the query, the second version of the application presented in the second language; and return an indication of the second resource to the interface.

(S13) A system may be configured as described in any of paragraphs (S8) through (S12), wherein the at least one computer-readable medium may be further encoded with additional instructions which, when executed by the at least one processor, further cause the computing system to receive an indication of a selection of a search result; and modify a model used when performing the translating to reflect an association between the query and the search result.

The following paragraphs (CRM1) through (CRM13) describe examples of computer-readable media that may be implemented in accordance with the present disclosure.

(CRM1) At least one non-transitory, computer-readable medium may be encoded with instructions which, when executed by at least one processor included in a computing system, cause the computing system to receive, via a first application presenting an interface in a first language, a first query entered in a second language different from the first language; search resources accessible to a second application to identify at least a first resource corresponding to the first query, the second application being in the second language; and return, to the interface and based at least in part on a result of the searching, an indication of the first resource.

(CRM2) At least one computer-readable medium may be configured as described in (CRM1), wherein the first resource is in the first language.

(CRM3) At least one computer-readable medium may be configured as described in paragraph (CRM1) or paragraph (CRM2), and may further be encoded with additional instructions which, when executed by the at least one processor, further cause the computing system to search resources accessible to the first application to identify at least a second resource corresponding to the first query; and return an indication of the second resource to the interface.

(CRM4) At least one computer-readable medium may be configured as described in any of paragraphs (CRM1) through (CRM3), and may further be encoded with additional instructions which, when executed by the at least one processor, further cause the computing system to determine, based on the search, a resource identifier corresponding to a first version of the first resource, the first version being in the second language; and determine, based on the resource identifier, a second version of the first resource, the second version being in the first language and wherein returning the indication of the first resource includes returning an indication of the second version.

(CRM5) At least one computer-readable medium may be configured as described in any of paragraphs (CRM1) through (CRM4), and may further be encoded with additional instructions which, when executed by the at least one processor, further cause the computing system to translate, prior to the search, the first query to determine a translated query, wherein the search is performed using the translated query; receive an indication of a selection of a search result; and modify data used when performing the translating to reflect an association between the first query and the search result.

(CRM6) At least one computer-readable medium may be configured as described in any of paragraphs (CRM1) through (CRM5), wherein the search identifies a first version of the first resource presented in the second language, and the indication of the first resource is an indication of a second version of the first resource presented in the first language.

(CRM7) At least one computer-readable medium may be configured as described in any of paragraphs (CRM1) through (CRM6), and may further be encoded with additional instructions which, when executed by the at least one processor, further cause the computing system to determine that the first query represents an abbreviation; and expand the abbreviation to generate an expanded query, wherein the search identifies the first resource as corresponding to the expanded query.

(CRM8) At least one non-transitory, computer-readable medium may be encoded with instructions which, when executed by at least one processor included in a computing system, cause the computing system to receive, via an application presenting an interface in a first language, a query entered in a second language different from the first language; translate the query from the second language into a different language to generate a translated query; search resources accessible by the application to identify at least a first resource that corresponds to the translated query; and return, to the interface and based at least in part on a result of the searching, an indication of the first resource, wherein the first resource is presented in the first language.

(CRM9) At least one computer-readable medium may be configured as described in (CRM8), wherein translating the query includes translating the query into the first language.

(CRM10) At least one computer-readable medium may be configured as described in paragraph (CRM8) or paragraph (CRM9), wherein searching the resources accessible by the application includes searching resources presented in the first language and accessible by the application, wherein identifying the first resource that corresponds to the translated query includes identifying a first version of the first resource in a same language as the translated query, and wherein the at least one computer-readable may further be encoded with additional instructions which, when executed by the at least one processor, further cause the computing system to determine a resource identifier corresponding to the first version of the first resource; and determine, based on the resource identifier, a second version of the first resource presented in the first language, wherein returning the indication of the first resource includes returning an indication of the second version of the first resource.

(CRM11) At least one computer-readable medium may be configured as described in any of paragraphs (CRM8) through (CRM10), and may further be encoded with additional instructions which, when executed by the at least one processor, further cause the computing system to determine that the query represents an abbreviation; determine a string represented by the abbreviation; and translate the string to determine the translated query.

(CRM12) At least one computer-readable medium may be configured as described in any of paragraphs (CRM8) through (CRM11), wherein the searching resources accessible by the application includes searching resources accessible by a first version of the application, the first version of the application presented in the first language, and wherein the at least one computer-readable medium may further be encoded with additional instructions which, when executed by the at least one processor, further cause the computing system to search resources accessible by a second version of the application to identify at least a second resource that corresponds to the query, the second version of the application presented in the second language; and return an indication of the second resource to the interface.

(CRM13) At least one computer-readable medium may be configured as described in any of paragraphs (CRM8) through (CRM12), and may further be encoded with additional instructions which, when executed by the at least one processor, further cause the computing system to receive an indication of a selection of a search result; and modify a model used when performing the translating to reflect an association between the query and the search result.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method, comprising:
receiving, by a computing system and via an application presenting an interface in a first language, a query entered in the first language;
executing a first search using a first language search index to identify a first resource corresponding to the query, wherein the first resource is provided in the first language;
using a machine translation model to translate the query from the first language to a second language, thereby producing a translated query;
executing a second search using a second language search index to identify a second resource corresponding to the translated query and to further identify a resource identifier associated with the second resource, wherein the second resource is provided in the second language, and wherein the resource identifier is identified as a result of executing the second search;
using, by the computing system, the resource identifier to identify a version of the second resource provided in the first language;
returning, to the interface, composite search results that list the first resource provided in the first language and the version of the second resource provided in the first language;
receiving a selection of the version of the second resource provided in the first language from the interface; and
training the machine translation model that was used to translate the query to reflect an increased probability of existence of an association between the translated query and the version of the second resource provided in the first language.

2. The method of claim 1, wherein the application is a first search engine configured to search the first language search index.

3. The method of claim 1, wherein the composite search results include a first network address that provides access to the first resource.

4. The method of claim 1, further comprising:
identifying, based on the entered query, the second language; and
selecting the second language search index based on identification of the second language.

5. The method of claim 1, wherein the interface comprises a search bar presented in the first language.

6. The method of claim 1, further comprising:
determining that the query includes an abbreviation; and
expanding the abbreviation to generate an expanded query, wherein the expanded query is used to identify the first resource.

7. A computing system comprising at least one processor and at least one non-transitory computer-readable medium encoded with instructions which, when executed by the at least one processor, cause the computing system to:
receive, via an application presenting an interface in a first language, a query entered in the first language;
execute a first search using a first language search index to identify a first resource in the first language that corresponds to the query;
use a machine translation model to translate the query from the first language to a second language, thereby producing a translated query;
execute a second search using a second language search index to identify a second resource in the second language corresponding to the translated query and to further identify a resource identifier associated with the second resource, wherein the resource identifier is identified as a result of executing the second search;
use, by the computing system, the resource identifier to identify a version of the second resource provided in the first language;
return, to the interface, composite search results that list the first resource provided in the first language and the version of the second resource provided in the first language;
receive a selection of the version of the second resource provided in the first language; and
train the machine translation model that was used to translate the query to reflect an increased probability of existence of an association between the translated query and the version of the second resource provided in the first language.

8. The computing system of claim 7, wherein the application is a first search engine configured to search the first language search index.

9. The computing system of claim 7, wherein the composite search results include a first network address that provides access to the first resource.

10. The computing system of claim 7, wherein the at least one non-transitory computer-readable medium is further encoded with additional instructions which, when executed by the at least one processor, further cause the computing system to:
identify, based on the entered query, the second language; and
select the second language search index based on identification of the second language.

11. The computing system of claim 7, wherein the interface comprises a search bar presented in the first language.

12. The computing system of claim 7, wherein the at least one non-transitory computer-readable medium is further encoded with additional instructions which, when executed by the at least one processor, further cause the computing system to:
determine that the query includes an abbreviation; and
expand the abbreviation to generate an expanded query, wherein the expanded query is used to identify the first resource in the first language.

13. A non-transitory computer readable medium storing processor executable instructions to perform a cross-language search, the instructions comprising instructions to:
receive, via an application presenting an interface in a first language, a query entered in the first language;
execute a first search using a first language search index to identify a first resource in the first language that corresponds to the query;
use a machine translation model to translate the query from the first language to a second language, thereby producing a translated query;
execute a second search using a second language search index to identify a second resource in the second language corresponding to the translated query and to further identify a resource identifier associated with the second resource, wherein the resource identifier is identified as a result of executing the second search;
use, by a computing system, the resource identifier to identify a version of the second resource provided in the first language;
return, to the interface, composite search results that list the first resource provided in the first language and the version of the second resource provided in the first language;
receive a selection of the version of the second resource provided in the first language; and
train the machine translation model that was used to translate the query to reflect an increased probability of existence of an association between the translated query and the version of the second resource provided in the first language.

14. The non-transitory computer readable medium of claim 13, wherein the application is a first search engine configured to search the first language search index.

15. The non-transitory computer readable medium of claim 13, wherein the composite search results include a first network address that provides access to the first resource.

16. The non-transitory computer readable medium of claim 13, wherein the instructions further comprise instructions to:
identify, based on the entered query, the second language; and
select the second language search index based on identification of the second language.

17. The non-transitory computer readable medium of claim 13, wherein the interface comprises a search bar presented in the first language.

18. The non-transitory computer readable medium of claim 13, wherein the instructions further comprise instructions to:
determine that the query includes an abbreviation; and
expand the abbreviation to generate an expanded query, wherein the expanded query is used to identify the first resource in the first language.

* * * * *